United States Patent
Kurtz et al.

[11] Patent Number: 5,999,082
[45] Date of Patent: Dec. 7, 1999

[54] COMPENSATED OIL-FILLED PRESSURE TRANSDUCERS

[75] Inventors: Anthony D. Kurtz, Ridgewood; John R. Hayer, Woodcliff Lakes; Robert Gardner, Westwood; Lou DeRosa, Wayne, all of N.J.; Leo Geras, Pearl River, N.Y.

[73] Assignee: Kulite Semiconductor Products, Inc., Leonia, N.J.

[21] Appl. No.: 09/047,548

[22] Filed: Mar. 25, 1998

[51] Int. Cl.[6] .................................................... H01C 10/10
[52] U.S. Cl. .................................... 338/42; 338/4; 338/36
[58] Field of Search .............................. 338/4, 2, 42, 36; 73/721, 727

[56] References Cited

U.S. PATENT DOCUMENTS

| | | | |
|---|---|---|---|
| 3,909,924 | 10/1975 | Vindasius et al. | 29/574 |
| 4,379,279 | 4/1983 | Nasiri | 338/42 |

OTHER PUBLICATIONS

Young, Hugh D., (University Physics, Chapter 14—"Fluid Mechanics"), pp. 392 and 393, Eighth edition. No Date.

*Primary Examiner*—Michael L. Gellner
*Assistant Examiner*—Richard Lee
*Attorney, Agent, or Firm*—Arthur L. Plevy

[57] ABSTRACT

A pressure transducer employing a metal isolation diaphragm. A volume of oil is located between the metal diaphragm and a silicon sensor received in a base member. In order to reduce errors at very low pressure caused by the oil exerting a tension on the deflecting portion of said silicon sensor, the metal diaphragm has an extending dome or dimple above the location of the silicon sensor. The silicon sensor is also recessed below the supporting base plate so that the separation between the silicon sensor and the metal diaphragm increases. The base plate also contains a series of shallow, narrow concentric grooves which further reduces surface tension between the metal diaphragm and the base plate.

8 Claims, 3 Drawing Sheets

Figure 1:
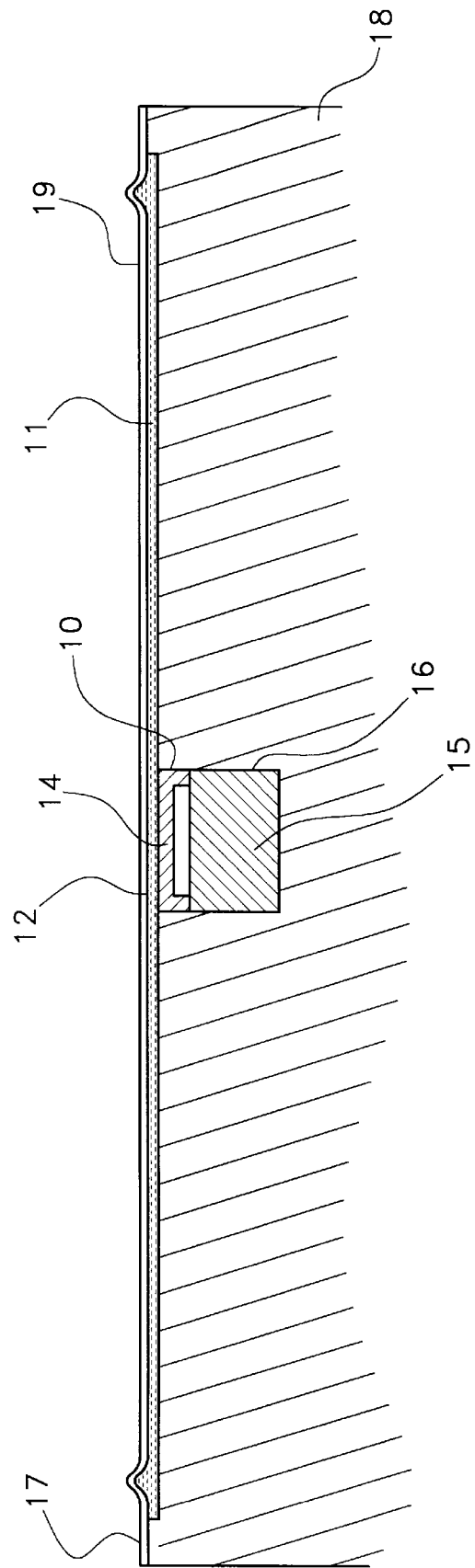

COMPENSATED OIL-FILLED PRESSURE TRANSDUCERS

COMPENSATED OIL-FILLED PRESSURE TRANSDUCERS

The present invention is generally related to a pressure transducer and more particularly to a pressure transducer employing a fluid as an oil for transferring pressure to a diaphragm.

BACKGROUND OF THE INVENTION

As is well known, many pressure transducers generally employ piezoresistive elements which are disposed on a silicon sensor and which when subjected to a force or pressure exhibit a change in resistance.

Such devices have been used with oil which oil or fluid is employed as a force transmitting medium. In such devices the external pressure applied to the diaphragm or transducer is normally quite large. These devices frequently employ a metal diaphragm as a force collector, and a media isolator. The metal diaphragm communicates with a silicon pressure sensor through an oil filled reservoir which is contained in an internal hollow in the transducer housing.

For an example of a prior art device reference is made to U.S. Pat. No. 4,406,993 entitled "OIL-FILLED PRESSURE TRANSDUCERS" issued on Sep. 27, 1983 to Anthony D. Kurtz, the inventor herein, and assigned to Kulite Semiconductor Products, Inc., the assignee herein. Generally when silicon pressure sensor diaphragms are used to measure pressure in a relatively hostile environment, it is frequently necessary to isolate the silicon sensor from the pressure media by means of the metal isolation diaphragm as indicated. The media pressure is coupled to the silicon sensor by means of the oil layer which is located between the isolation diaphragm and the silicon sensor. This technique works very well for moderate pressures and temperatures. However, as the temperature increases, the oil will expand in volume. Unless the metal isolation diaphragm is not sufficiently compliant to deflect enough to accommodate the increase in oil volume, a thermally induced pressure will build up in the oil which will be transmitted to the silicon sensor. This effect gives rise to an error in the pressure measurement. For this reason, the metal diaphragm is made as compliant as possible and the oil volume is reduced as much as possible. The simplest way to increase the compliance of the metal diaphragm is to increase its radius and decrease its thickness since the compliance for any pressure is proportional to $$\frac{R^4}{t^3}$$

where R is the radius and t is the thickness of the metal diaphragm. In addition, the expansion of the oil volume with temperature is proportional to the total oil volume. The easiest way to decrease the oil volume is to make the space between the metal diaphragm and the silicon sensor as small as possible. In most cases, by following the above rules the thermally induced error can be reduced to very low values and a very accurate transducer can be built.

However, when pressure measurements must be made very, very close to zero pressure, a new problem arises, which in fact is caused by obeying the aforestated rules. When the spacing between the metal isolation diaphragm and silicon sensor becomes too small (on the order of 0.010 inches) and the spacing between the isolation diaphragm and the mounting surface becomes on the order of 0.002 inches to 0.004 inches, surface tension at the metal diaphragm mounting surface through the oil medium and between the metal diaphragm and the silicon sensor through the oil medium can become significant. When the oil layer becomes sufficiently thin, then the surface tension between the metal diaphragm and the mounting surface and the metal diaphragm and the silicon becomes significant. As the pressure outside the metal increases, the diaphragm is steadily reduced, the surface tension causes the metal diaphragm to adhere to the mounting surface and to the silicon diaphragm. This places the oil in tension and causes the silicon diaphragm to deflect towards the metal diaphragm giving, in effect, a negative pressure reading.

It is therefore an object of the present invention to prevent this negative pressure reading while still allowing accurate pressure measurements.

SUMMARY OF INVENTION

An oil filled pressure transducer, comprising: a base member having a recess for containing a pressure sensor, said pressure silicon sensor having a diaphragm with a top pressure receiving surface with piezoresistive elements located on said deflecting portion of the silicon sensor, said base member having a peripheral flange, a metal force transmitting diaphragm coupled to said peripheral flange and having a raised area above said sensor for increasing the separation between said sensor and said isolation diaphragm, and a volume of liquid located between the metal diaphragm and said base member for covering said sensor, with said thickness of the liquid volume being greater over said sensor than at said remainder of said base member.

BRIEF DESCRIPTION OF THE FIGURES

FIG. 1 shows a prior art pressure transducer utilizing a metal diaphragm and oil fill.

FIG. 2 depicts an improved pressure transducer according to this invention.

FIG. 3 is a top view of the improved pressure transducer of FIG. 2.

DETAILED DESCRIPTION OF THE FIGURES

Referring to FIG. 1 there is shown a prior art oil-filled pressure transducer. Essentially, the pressure transducer consists of a silicon member 14 having located on the top or bottom surface a bridge arrangement of a piezoresistive configuration. Such sensors are very well known in the art and many examples exist. Normally the sensor consists of a cup-shaped member which is coupled to a base 15. The entire sensor is placed within an aperture 16 located within a metal header or other device 18. Generally the metal header 18 has a peripheral flange to which a metal diaphragm 19 is welded or otherwise coupled to. As seen in the figure, the metal diaphragm 19 may be fabricated from stainless steel or some other material and there is a layer of oil 11 which appears between the metal diaphragm 19 and the top force receiving surface of the sensor 10. The sensor 10 comprises a semiconductor diaphragm of an inverted "cup" shaped configuration having located within the active area a piezoresistive array. Such arrays are well known in the art. See U.S. Pat. No. 3,654,579 entitled "ELECTROMECHANICAL TRANSDUCERS AND HOUSINGS" issued on Apr. 4, 1972 to Anthony Kurtz, the inventor herein and assigned to the assignee herein. A thin film of oil 14 appears above the top force receiving surface of the sensor. At the point indicated by the reference numeral 12 there exists a surface tension. As one can understand the stress in a liquid is ordinarily compressive, but in some circumstances liquids can sustain tensile stresses. A typical example is in a case of a cylindrical tube that is closed at one end and has a tight fitting piston at the other. If the tube is filled completely with a liquid that wets both the inner surface of the tube and the piston face, the molecules of liquid adhere to all the surfaces. If the surfaces are very clean and the liquid very pure, then when the piston face is pulled a tensile stress is created with a slight increase in volume. In this manner, the liquid is being stressed and adhesive forces prevent it from pulling away from the walls of the container. This situation is highly unstable and a liquid under tension tends to break up into many small droplets. In any event, it is this effect that causes a negative pressure on the sensor which is related to the surface tension of the oil and this occurs in prior art transducers as shown in FIG. 1.

Figure 2:
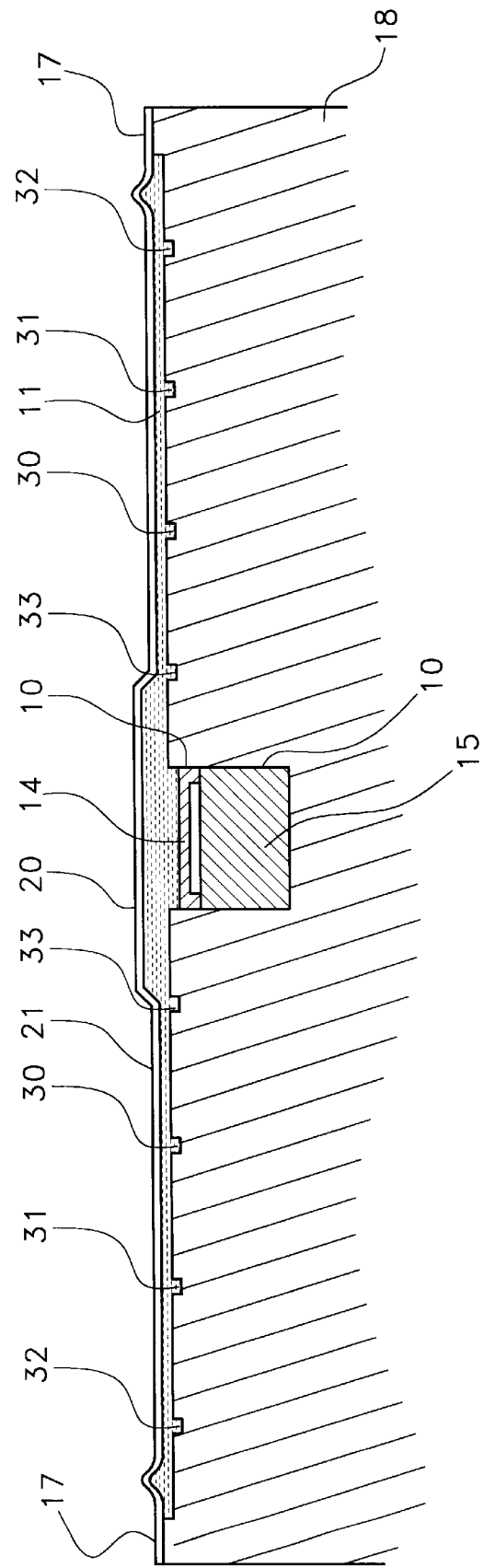
Figure 3:
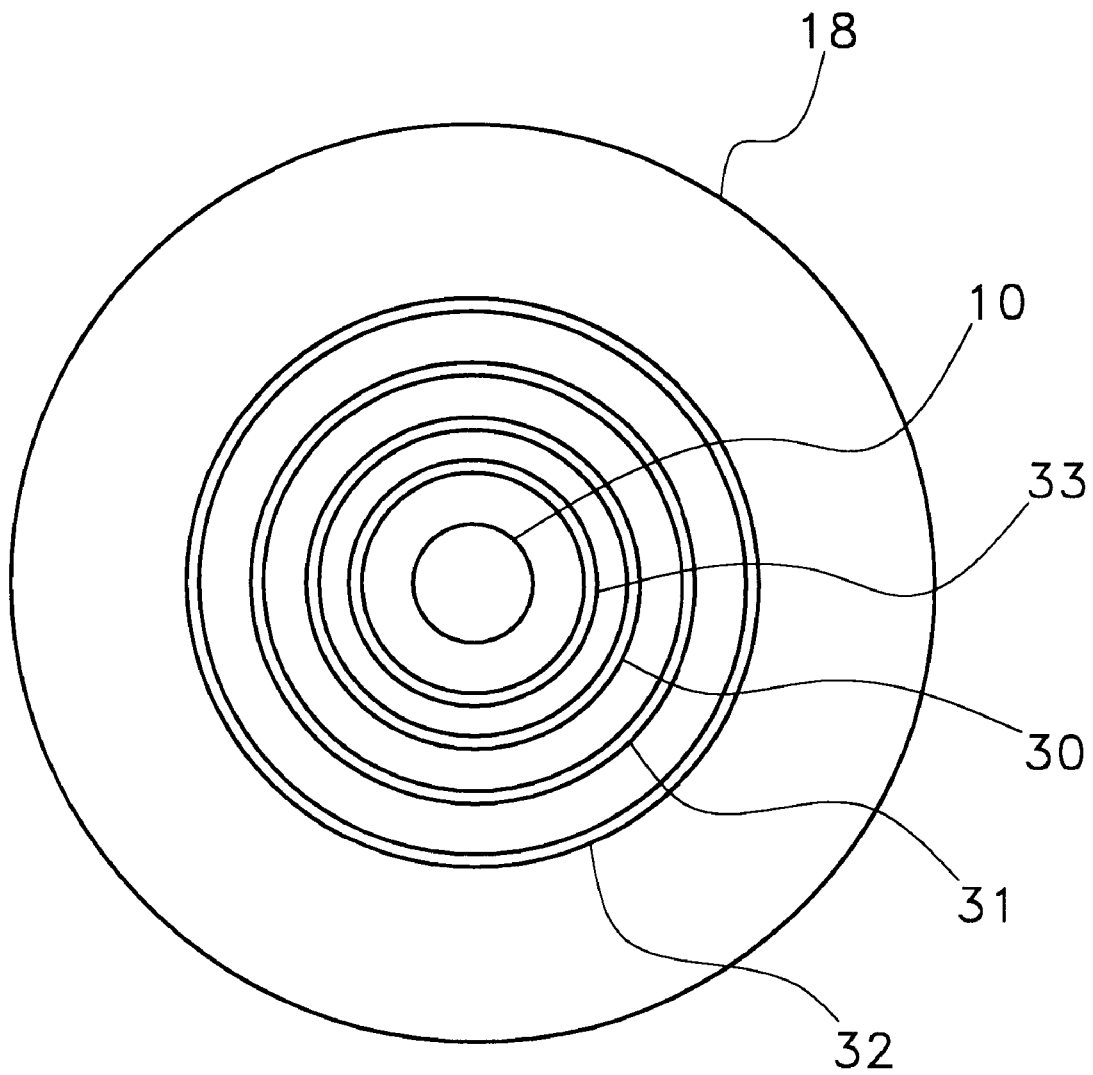

Referring to FIG. 2, there is shown a transducer according to this invention. It is noted in FIG. 2 that the reference numerals are indicated to show similar operating parts. Referring to FIG. 2, in order to reduce errors at very low pressure caused by the oil 14 exerting a tension on the silicon diaphragm 10, the following measures are employed. Since the upward tension on the silicon sensor 10 depends inversely on the vertical distance between the metal diaphragm 21 and the sensor 10, this separation is increased. This is done by slightly lowering the recess in the base plate 18 at which the sensor is mounted such that the top surface of the sensor is at least 0.02 inches below the surface of the base plate 18. This is shown clearly in FIG. 2 as, for example, compared to FIG. 1 wherein the sensor structure 15 is mounted below the top surface of the base plate 18. As also seen in FIG. 2, there is an upward dimple or projection or dome 20 in the metal diaphragm in the region directly over the top surface of the sensor of a diameter somewhat larger than the sensor and of a height of about 0.010 inches. This dimple or dome 20 enables the oil positioned above the sensor to increase in thickness. One can also employ a series of concentric grooves 30, 31 and 33 in the base plate 18 of widths about 0.010 inches and depths of about 0.005 inches. Referring to FIG. 3, these concentric grooves 30, 31 and 33 also reduce the surface tension forces between the metal diaphragm 21 and the base member 18.

These changes will do little to increase the overall oil volume. For instance, with a metal isolation diaphragm of a diameter of 1.5 inches and a separation from the metal base plate 18 of 0.004 inches, the oil volume is given by $$V = \frac{\Pi D^2}{4} S$$

where D is the diameter of the isolation diaphragm and S is the separation from the base plate. Thus $$V = 2.25\Pi \times .004$$
$$= 7.07 \times 10^{-3} \text{ in}^3$$

If the recess for the sensor is 0.100 inches diameter and the depth is increased to 0.020 inches, the additional volume is $$\frac{.1^2}{4} \Pi \times .020$$

-continued
$$.01\Pi \times .005 = 5\Pi \times 10^{-5} \text{ in}^3$$
$$= 1.57 \times 10^{-4} \text{ in}^3$$

This results in an increase in oil volume of about 2%.

If four grooves are cut into the base plate of 0.2D, 0.4D, 0.6D and 0.8D with approximate width of 0.010 inches and depths of 0.005 inches, then (1) $.2 \times 1.5 \times \Pi \times .010 \times .005$ $1.0 \times 5 \times \times 10^{-5} = 5 \times 10^{-5} \text{ in}^3$ (2) $10 \times 10^{-5} \text{ in}^3$ (3) $15 \times 10^{-5} \text{ in}^3$ (4) $20 \times 10^{-5} \text{ in}^3$ in total $50 \times 10^{-5}$ in$^3$ or a percentage increase of $$\frac{50 \times 10^{-5}}{7 \times 10^{-3}} = 7\%.$$

Thus, the total increase in oil volume is about 10% with D~1". This may increase to about 25% but still a very small increase. However these changes in the geometry of the system drastically reduce the effect of surface tension on the sensor without significantly increasing the back pressure caused by oil expansion.

As one can ascertain from the above, the present invention operates to reduce errors at very low pressure caused by the oil exerting a tension on the silicon diaphragm. For example of low pressure transducers, reference is made to U.S. Pat. No. 4,025,942 entitled "LOW PRESSURE TRANSDUCERS EMPLOYING LARGE SILICON DIAPHRAGMS HAVING NON-CRITICAL ELECTRICAL PROPERTIES" issued on May 24, 1977 to Anthony D. Kurtz, the inventor herein and assigned to Kulite Semiconductor Products, Inc, the assignee herein. Basically, this patent shows low pressure transducers which employ piezoresistive bridges deposited on or diffused within the wafer of silicon. The wafer is typically secured to a glass sheet and then bonded to a silicon diaphragm of relatively large size and fabricated from a distinct piece of silicon non-critical electrical characteristics. See also U.S. Pat. No. 4,016,644 entitled "METHODS OF FABRICATING LOW PRESSURE SILICON TRANSDUCERS" issued on Apr. 12, 1977 to Anthony D. Kurtz and assigned to the assignee herein.

What is claimed is:

1. An oil filled pressure transducer, comprising:
   a base member comprising:
      a first surface;
      a recess in said first surface for accommodating a pressure sensor, said pressure sensor including a diaphragm which deflects responsively to an applied pressure, said diaphragm including a top pressure receiving surface recessed with respect to said first surface of said base member and at least one piezoresistive element;
      a series of concentric grooves in said first surface;
      a peripheral flange; and,
      a force transmitting diaphragm coupled to said peripheral flange and including a raised portion positioned above said pressure sensor for providing a separation between said pressure receiving surface and said force transmitting diaphragm; and, a quantity of liquid interposed between the force transmitting diaphragm and said base member so as to cover said pressure sensor, wherein a volume of said liquid over said pressure sensor is greater than at a remainder of said base member.

2. The pressure transducer of claim 1, wherein said series of concentric grooves are configured so as to reduce surface tension forces between said force transmitting diaphragm and said base member.

3. The transducer of claim 1, wherein said pressure sensor is a silicon sensor having piezoresistive sensing elements positioned on the deflecting portion area of said sensor.

4. The transducer of claim 1, wherein said base member is metal.

5. The transducer according to claim 4 wherein said metal diaphragm is stainless steel.

6. The transducer of claim 1, wherein said metal diaphragm is welded to said flange.

7. The transducer of claim 1, wherein said liquid is oil.

8. The transducer according to claim 4 wherein the separation between the bottom of said metal diaphragm and the pressure receiving surface of said sensor is greater than 0.020 inches.

* * * * *